United States Patent Office 2,920,938
Patented Jan. 12, 1960

2,920,938

METHOD FOR MANUFACTURE OF ALUMINUM FLUORIDE

William R. Matoush, Westchester, Ill., assignor to International Minerals & Chemical Corporation, a corporation of New York No Drawing. Application August 16, 1956
Serial No. 604,297

10 Claims. (Cl. 23—88)

This invention relates to the manufacture of aluminum fluoride of high purity. More particularly, it relates to the production of aluminum fluoride for use in the electrolytic process for production of aluminum metal. Still more particularly, it relates to the production of pure aluminum fluoride from impure starting materials contaminated, for example, with silica and phosphorus.

Pure aluminum fluoride is commercially produced by the reaction of high purity aluminum or aluminum hydroxide with substantially pure hydrofluoric acid, the latter generally produced by the reaction of fluorspar with sulphuric acid. When aluminum fluoride is produced from impure starting materials the product will usually contain sufficient silica and phosphate and/or iron to render it unfit for use in the production of aluminum or ceramic bodies. In order to have starting materials of sufficient purity so that the reaction products will meet the commercial specifications, purification operations involving substantial expense are necessitated.

When aluminum fluoride has been prepared by reacting impure starting material such as impure fluosilicic acid, the solution of aluminum fluoride obtained after removal of precipitated materials has been so dilute as to be uneconomical for evaporation to be used to recover the aluminum fluoride salt. In addition, one of the impurities, as to which there is strict specification because of its effect in the fused alumina baths namely phosphate, is not precipitated but remains in the aluminum fluoride solution.

It is a primary object of this invention to overcome the shortcomings and disadvantages of the process heretofore in use.

It is another object of this invention to provide a method of manufacturing aluminum fluoride of high purity from impure fluosilicic acid.

It is a further object of this invention to provide a method of producing substantially pure aluminum fluoride from phosphate contaminated fluoride-bearing acids.

It is a still further object of this invention to provide a method of crystallizing substantially pure aluminum fluoride from strongly acidic phosphate contaminated fluosilicic acid.

It is still another object of this invention to provide a process for reaction of impure starting materials wherein aluminum fluoride may be crystallized in substantially pure form thus eliminating the need to revise the starting materals. These and other objects of the invention will be apparent from the following description to those skilled in the art.

The process of the present invention comprises admixing aluminum-bearing material with a phosphate contaminated fluorine-containing acid at a temperature in the range between about 100° F. and about 190° F., adjusting the acidity of the admixture with strong acids, removing any insoluble material, and then effecting crystallization of aluminum fluoride trihydrate from the strongly acid solution, and recovering the substantially phosphate free aluminum fluoride product.

The aluminum-bearing reactant may be mixed with fluorine containing acids in quantities sufficient to insure a mole ratio of aluminum to fluoride ions of approximately 1 to 3. A slight excess of aluminum ions is to be preferred over any excess of fluoride ions and in order to insure the above ratio excesses of $Al_2O_3$ up to about 20% over the stoichiometric amount necessary for reaction are used. This aluminum-bearing reactant may be added in the form of solid hydrated alumina or bauxite or slurries thereof.

A relatively inexpensive source of phosphate contaminated fluorine-containing acid is the fluosilicic acid obtained as a byproduct of the manufacture of superphosphate in which phosphate rock is reacted with sulphuric acid, or in the concentration of wet process phosphoric acid. This fluosilicic acid is obtained by absorbing evolved gases in aqueous mediums such as water or aqueous fluosilicic acid solution. Concentration of the fluosilicic acid can be controlled by the quantity of water fed to the absorber. The absorber effluent liquor seldom exceeds 28% $H_2SiF_6$. Usually fluorine containing liquor is obtained having between about 20% and about 25% $H_2SiF_6$ content. Fluosilicic acid of this range of concentration usually contains between about 0.15% and about 0.4% $P_2O_5$ by weight usually in the form of phosphate ion.

Fluosilicic acid of the above character can be reacted directly with alumina or other aluminum-bearing reactant under proper conditions to give crystalline material of low phosphate content. Alternatively, there may be added to the aqueous solution of fluosilicic acid a water soluble salt introducing a small amount of ferric ion. In the presence of small amount of ferric ion, for example, the amount introduced by adding 1% to 3% by weight of ferric sulfate hydrate, a substantial portion of the $P_2O_5$ contained in the acid may be removed from the system prior to the controlled precipitation of aluminum fluoride.

This fluosilicic acid starting material usually has a pH initially of less than 1. The solution obtained when this type acid is reacted with about the stoichiometric amount of aluminum-bearing material shows a pH of between about 3 and about 5.

Reaction of the impure acid and aluminum-bearing material proceeds smoothly at temperatures in the range between about 120° F. to about 190° F. and is preferably carried out in the range of temperature of about 145° F. and about 165° F. The time necessary for reaction at temperatures in the above range varies with temperature and the particle size of the aluminum bearing material, if solids are being added. Obviously, a small particle size is preferable for reaction because mixing can be more easily and rapidly accomplished, and a larger surface area of the solids is presented for reaction with the acid. The speed of reaction is particularly important at the higher temperatures where reaction time is shortest because unreacted solids must be removed from the resultant solution before aluminum fluoride begins to crystallize. Time for reaction when operating in the preferred range of temperature is about 1 to 2 hours, although the exact time depends on the nature of the aluminum-bearing reactant (e.g., particle size). At lower temperatures, the reaction time is lengthened and at higher temperature it is shortened. At about 190° F. the reaction time is about 20 minutes.

When the reaction has gone to completion or when the reaction has proceeded to the point of maximum solubility of aluminum fluoride depending upon the particular operating conditions, solid material consisting of excess alumina, precipitated silica and insoluble impurities from both reactants is separated from the solution, as by filtration.

The present invention is predicated upon the discovery that if the aluminum fluoride is to be crystallized in substantially phosphate free form from the impure solution, the crystallizing must take place under strongly acidic conditions. To attain the strongly acidic condition, various acids are added either prior to or subsequent to filtration. Preferably the acid is added to the solids-free metastable solution of aluminum fluoride. As a means of improving recovery of aluminum fluoride the acid is preferably used to wash the solids filtered from the reaction solution and then the acid washings added to the resultant solution to adjust its acidity.

The acid used may be any of the strong acids, for example, mineral acids such as sulphuric acid, hydrochloric acid, perchloric acid, nitric acid and the like. The amount of acid required will vary with the concentration of $P_2O_5$ contaminant in the solution. In 20 to 25% $H_2SiF_6$ solutions, $P_2O_5$ concentrations generally are of the order of 0.15% to 0.35% $P_2O_5$. The strong acid is added in amounts sufficient to raise the normality of the solution to between about 0.5 normal and about 5 normal. In this discussion of normality, a normal solution is defined as one which contains one gram equivalent of the acid in one liter of solution. In the case of a dibasic acid (e.g., $H_2SO_4$) such a normal solution contains one half of a gram molecular weight of the acid, which is equal to one gram equivalent, per liter of solution.

Increase in acidity has the effect of drastically reducing the $P_2O_5$ contamination of the crystallized aluminum fluoride. After reacting a fluosilicic acid of about 25% $H_2SiF_6$ content with the stoichiometric amount of alumina, the acidity of the resultant solution was adjusted to give various normalities. The products which crystallized from these solutions were dried at 110° C. to approximately $AlF_3.3H_2O$ and these were analyzed for $P_2O_5$ content. Results obtained when the normality of the solution was adjusted with concentrated sulphuric acid were as follows:

Acidity: Percent $P_2O_5$
No added acid_____ 0.3
0.5 N_____ .074
1.0 N_____ .045
5.0 N_____ .019

Adjustment of the acidity with hydrochloric acid is more effective in reducing the $P_2O_5$ content of crystallized aluminum fluoride than sulphuric acid.

Results when substituting hydrochloric acid for sulphuric acid were as follows:

Acidity: Percent $P_2O_5$
No added acid_____ 0.25
0.5 N_____ 0.048
1.5 N_____ 0.025

The amount of acid to be added generally will be determined by $P_2O_5$ specifications of the product. However, when adding acid, care must be taken so that the acidity is not pushed to the point where aluminum salts of the added acid are simultaneously precipitated with the aluminum fluoride.

After adjustment of the acidity of the solution to the proper level, the solution is subjected to any one of a number of procedures for crystallization of aluminum fluoride. Upon standing or ageing the solids-free solution, aluminum fluoride crystallizes out as aluminum fluoride trihydrate. Holding the solution at a temperature in the range between about 50° F. and 175° F. speeds up the crystallization of aluminum fluoride trihydrate. Under these heating conditions, crystallization occurs in from 15 minutes to 60 minutes. When ageing the solution without heating, crystallization occurs depending upon concentration and temperature between about 2 and about 6 hours. Crystallization can be induced by seeding the solids-free solution or concentrated solutions with comminuted hydrated aluminum fluoride. However, acidified solutions respond to seeding at a slower rate than do solutions to which additions of acid have not been made.

A major amount of aluminum fluoride may be crystallized from reaction solution acidified to 1 normal acidity without seeding, for example, 55% of aluminum fluoride is crystallized upon aging the solution for 3 days. In the same period of time, viz., 3 days, seeding caused approximately 85% of the aluminum fluoride to be crystallized from the solution.

Aluminum fluoride trihydrate can be converted into anhydrous aluminum fluoride by calcining at temperatures in the range between about 450° F. to about 600° F.

Recovery of fluorine in the high purity aluminum fluoride product by the aging process is of the order of 60 to 70%. Upon separation of this low phosphate content product from the solution there remains a liquor considerably enriched in phosphate ions and which, in addition, contains some aluminum and fluoride ions. A further recovery of aluminum and fluorine may be made by reacting the liquor with fresh aluminum-bearing reactant as in the original process. The liquor separated from this secondary reaction is not acidified but rather, aluminum fluoride trihydrate is crystallized directly by seeding with previously precipitated product. Isolation of this secondary product raises the over-all recovery of fluorine initially present to between about 85 and 95%. The secondary product, although too highly contaminated with phosphate ion to be useful for the same purpose as the primary product, is used where phosphate ion impurity is not critical. The invention will be more fully illustrated by the following example which is given by way of illustration and without any intention that the invention be limited thereto.

*Example*

Alumina trihydrate was ground to a particle size 90% of which passed through a 100 mesh standard screen. The ground solids were added to approximately 25% fluosilicic acid having analysis as follows:

Grams/liter
F _____ 235.6
Si _____ 61.4
$P_2O_5$ _____ 2.4

The fluosilicic acid was maintained at a temperature of approximately 160° F. for approximately one and one-half hours. The slurry was then filtered to remove silica and residual alumina. The filtrate contained approximately 250 grams per liter of aluminum fluoride calculated as the anhydrous salt.

The filtrate was of pH 3–5. To each 1000 volumes of filtrate was added 27.8 volumes of 96% sulphuric acid.

The solution was seeded with aluminum fluoride trihydrate and then held at room temperature and agitated until crystallization was substantially complete. The crystallized aluminum fluoride was filtered from the resultant liquor. The aluminum fluoride crystal product analyzed by weight:

Material: Percent by weight
$Al_2O_3$ _____ 61.5
F _____ 65.0
$SiO_2$ _____ 0.1
$P_2O_5$ _____ 0.08

This analysis shows a fluoride recovered in the form of aluminum fluoride of about 70%. The end liquor after filtration of the aluminum fluoride crystallizes therefrom, analyzes as follows:

Material: Grams/liter
$AlF_3$ _____ 36.3
$P_2O_5$ _____ 0.1

To each 1000 milliliters of end liquor was added 65 grams of alumina trihydrate. The slurry was reacted at a temperature of approximately 160° F. After reacting for approximately 2 hours, the slurry was filtered to remove solids and the solids-free solution allowed to stand for about 6 hours during which time the solution cooled to room temperature. Upon cooling, the crystallization occurred producing a secondary aluminum fluoride product.

On the basis of analysis, fluoride recovered from the fluosilicic acid in the form of aluminum fluoride is about 90%.

Having thus described my invention, what I claim is:

1. A process for the manufacture of aluminum fluoride low in phosphate content which comprises admixing aluminum-bearing material with fluorine-containing acid contaminated with between about 0.15% and about 0.4% phosphate calculated on a $P_2O_5$ weight basis at a temperature between about 100° F. and about 190° F., separating solids from the reacted solution, adjusting the acid normality of the admixture with sufficient strong mineral acid, selected from the group consisting of sulfuric, nitric, perchloric and hydrochloric acids, to obtain a solution of at least about 0.5 normal, thereafter effecting crystallization of the aluminum fluoride trihydrate from the solids-free solution and recovering the aluminum fluoride trihydrate crystals from the resultant liquor.

2. A process according to claim 1 in which the fluorine-containing acid is phosphate contaminated fluosilicic acid.

3. The process according to claim 1 in which the aluminum-bearing material is bauxite.

4. A process for the manufacture of aluminum fluoride low in phosphate content which comprises admixing aluminum-bearing material with fluorine-containing acid contaminated with between about 0.15% and about 0.4% phosphate calculated on a $P_2O_5$ weight basis at a temperature between about 100° F. and about 190° F., the amount of added aluminum-bearing material introducing at least the stoichiometric amount of $Al_2O_3$ for reaction, separating solids from the solution of reaction products, adjusting the acid normality of the admixture with sufficient strong mineral acid, selected from the group consisting of sulfuric, nitric, perchloric and hydrochloric acids, to obtain a solution of at least about 0.5 normal, thereafter effecting crystallization of the aluminum fluoride trihydrate from the solids-free solution and recovering the aluminum fluoride trihydrate crystals from the resultant liquor.

5. A process as in claim 4 in which the fluorine-containing acid is phosphate contaminated fluosilicic acid.

6. A process for the manufacture of aluminum fluoride low in phosphate content which comprises admixing aluminum-bearing material with fluorine-containing acid contaminated with between about 0.15% and about 0.4% phosphate calculated on a $P_2O_5$ weight basis at a temperature between about 100° F. and about 190° F., the amount of added aluminum-bearing material being sufficient to introduce at least the stoichiometric amount of $Al_2O_3$ for reaction, separating solids from the solution of reaction product, adjusting the acid normality of the admixture with sufficient strong mineral acid, selected from the group consisting of sulfuric, nitric, perchloric and hydrochloric acids, to obtain a solution of between about 0.5 normal and about 5.0 normal, effecting crystallization of the aluminum fluoride trihydrate from the solids-free solution and recovering the aluminum fluoride trihydrate crystals from the resultant liquor.

7. A process as in claim 6 in which the aluminum-bearing material is aluminum trihydrate.

8. A process as in claim 6 in which the fluorine-containing acid is phosphate contaminated fluosilicic acid.

9. A process as in claim 6 in which the aluminum fluoride trihydrate is produced by adding to the solids-free cooled solution seed crystals of aluminum fluoride trihydrate, aging the mixture and recovering an aluminum fluoride trihydrate crystalline product from the resultant liquor.

10. A process for the manufacture of aluminum fluoride low in phosphate content which comprises admixing aluminum-bearing material with fluorine-containing acid contaminated with between about 0.15% and about 0.4% phosphate calculated on a $P_2O_5$ weight basis at a temperature between about 100° F. and about 190° F., separating solids from the reacted solution, adjusting the acid normality of the admixture with sufficient strong mineral acid, selected from the group consisting of sulfuric, nitric, perchloric and hydrochloric acids, to obtain a solution of between about 0.5 normal and about 5.0 normal, adding to the solids-free solution seed crystals of aluminum fluoride trihydrate, aging the mixture, recovering the aluminum fluoride trihydrate crystalline product from the resultant liquor, adding to the resultant liquor an aluminum-bearing material, heating the mixture to a temperature in the range of between about 100° F. and about 190° F., separating insoluble material from the solution of reaction products, thereafter effecting crystallization of aluminum fluoride trihydrate from the solids-free solution and recovering the aluminum fluoride trihydrate crystals from the resultant liquor.

References Cited in the file of this patent

UNITED STATES PATENTS

| | | |
|---|---|---|
| 508,796 | Ackermann | Nov. 14, 1893 |
| 1,403,183 | Milligan | Jan. 10, 1922 |
| 1,797,994 | Morrow | Mar. 24, 1931 |
| 2,780,524 | Gloss et al. | Feb. 5, 1957 |

FOREIGN PATENTS

| | | |
|---|---|---|
| 15,083 | Great Britain | 1892 |
| 643,379 | Great Britain | Sept. 20, 1950 |